(12) United States Patent
Gray (10) Patent No.: US 11,937,733 B2
(45) Date of Patent: Mar. 26, 2024

(54) APPARATUS FOR MAKING A HOT BEVERAGE

(71) Applicant: BARISTA AND CO COFFEE LIMITED, Dorset (GB)

(72) Inventor: James Gray, Dorset (GB)

(73) Assignee: BARISTA AND CO COFFEE LIMITED (GB)

(*) Notice: Subject to any disclaimer, the term of this patent is extended or adjusted under 35 U.S.C. 154(b) by 759 days.

(21) Appl. No.: 16/966,617

(22) PCT Filed: Feb. 1, 2019

(86) PCT No.: PCT/GB2019/000017
§ 371 (c)(1),
(2) Date: Jul. 31, 2020

(87) PCT Pub. No.: WO2019/150069
PCT Pub. Date: Aug. 8, 2019

(65) Prior Publication Data
US 2021/0022544 A1    Jan. 28, 2021

(30) Foreign Application Priority Data
Feb. 1, 2018   (GB) .................... 1801626

(51) Int. Cl.
*A47J 31/38*   (2006.01)
*A47J 31/02*   (2006.01)
*A47J 31/06*   (2006.01)

(52) U.S. Cl.
CPC ............ *A47J 31/38* (2013.01); *A47J 31/02* (2013.01); *A47J 31/0657* (2013.01)

(58) Field of Classification Search
CPC ......... A47J 31/38; A47J 31/02; A47J 31/0657
See application file for complete search history.

(56) References Cited

U.S. PATENT DOCUMENTS 2,601,821 A   7/1952 Cecil
5,968,019 A * 10/1999 Lee ................. A61M 5/322
604/110

(Continued)

FOREIGN PATENT DOCUMENTS

AU   2010101197   1/2011
CN   106419560    2/2017
(Continued)

OTHER PUBLICATIONS

International Search Report from corresponding Application PCT/GB2019/000017 dated Jun. 3, 2019, pp. 1-3.
(Continued)

*Primary Examiner* — Nathaniel E Wiehe
*Assistant Examiner* — Keith Brian Assante
(74) *Attorney, Agent, or Firm* — The Belles Group, P.C.

(57) ABSTRACT

A hollow cylinder (102) contains hot water for making a hot beverage, for example, coffee. The cylinder (102) has an inner wall (102a) extending along an axis (104) from an open upper end (102b) to an open lower end (102c) of the cylinder. A perforated closure (106) is releasably securable to the cylinder (102) to hold the coffee at the lower end (102c). A cap (110) carries a plunger (112) configured and arranged for sealing engagement with the inner wall (102a) of the cylinder (102). In use, the cap (110) is rotatable on the cylinder (102) about the axis (104) and is connected to the cylinder (102) by a helical formation. Rotation of the cap (110) on the cylinder (102) drives the plunger (112) towards the lower end (102c) of the cylinder (102) to press the hot water through the perforated closure (106) and the coffee held thereon and then into the vessel (118).

17 Claims, 12 Drawing Sheets

(56) References Cited

U.S. PATENT DOCUMENTS 7,849,784 B2     12/2010   Adler
2013/0186280 A1*   7/2013   Sekiguchi ............. A47J 31/005
                                                                                  99/287

FOREIGN PATENT DOCUMENTS

KR            101703282       2/2017
WO          WO0145538      6/2001

OTHER PUBLICATIONS

Written Opinion of the International Searching Authority from corresponding Application PCT/GB2019/000017 dated Jun. 3, 2019, pp. 1-3.
UKIPO Search Report from corresponding GB Application No. 1801626.1 dated Jul. 27, 2018, pp. 1-2.
UKIPO Search Report from corresponding GB Application No. 1801626.1 dated Jul. 26, 2018, pp. 1.

* cited by examiner

APPARATUS FOR MAKING A HOT BEVERAGE

CROSS-REFERENCE TO RELATED PATENT APPLICATIONS

The present application is a U.S. national stage application under 35 U.S.C. § 371 of PCT Application No. PCT/GB2019/000017, filed Feb. 1, 2019, which claims priority to United Kingdom Patent Application No. 1801626.1, filed Feb. 1, 2018. The disclosures of the aforementioned priority applications are incorporated herein by reference in their entireties.

BACKGROUND OF THE INVENTION

This invention concerns an apparatus for making a hot beverage. The apparatus is particularly but not necessarily exclusively manually operable and used for making coffee, and it is described herein in that connection.

There are many ways of making coffee. Two which have been especially popular involve the use of a coffee filter and the use of a French press (also known as a cafetiére and by other names).

A coffee filter comprises a funnel which in use is placed over a jug to receive the made coffee. A filter, conventionally of paper configured to fit the funnel, is placed in the funnel and ground coffee placed upon it. Hot water is then poured into the funnel to drip slowly through the coffee, taking up its flavour, and into the jug, the filter holding back the spent grounds.

A French press comprises a jug into which the ground coffee is placed. Hot water is poured over the ground coffee in the jug and, after a "brewing" period during which the hot water takes up the flavour of the coffee, a perforated plunger is pressed down upon the coffee to hold the spend grounds back while the made coffee is poured from the jug.

Both the coffee filter and the French press came into widespread use many decades ago, but more recently coffee-making apparatus has been developed which combines the filter with a press mechanism. An example of such a filtering press is disclosed in U.S. Pat. No. 7,849,784 (Adler). Adler's filtering press comprises: a constant-diameter hollow cylinder having full-diameter top and bottom openings; a removable perforated cap that encloses the bottom opening; a removable air-tight piston that has an upper portion configured to be engaged by a user so that said piston, when inserted into said top opening and pressed with direct downward pressure exerted by the user, forces liquid in said hollow cylinder through said perforated cap; and a support to hold said press above the mouth of an open vessel.

Preferred embodiments of the present invention seek to overcome or alleviate the above described disadvantages of the prior art. For example, it is an object of the present invention to provide an improved filtering press for making coffee.

BRIEF SUMMARY OF THE INVENTION

According to the present invention there is provided an apparatus for making a beverage and delivering it into a vessel below the apparatus, which apparatus comprises:
a hollow cylinder for containing hot water for making the beverage, said cylinder having an inner wall and extending along an axis from an open upper end to an open lower end of the cylinder;
a perforated closure releasably securable to the cylinder to hold solid material for brewing the beverage at said lower end; and
a cap carrying a plunger configured and arranged for sealing engagement with the inner wall of the cylinder, characterised in that said cap is rotatable on said cylinder about said axis and is connected to the cylinder by a helical formation, such that rotation of the cap on the cylinder drives the plunger towards the lower end of the cylinder to press the hot water through the perforated closure and the solid material held thereon and thence into said vessel.

In a preferred embodiment the plunger is removable from said cap and the cap is removable from said cylinder.

In another preferred embodiment one of a radially outer surface of the hollow cylinder and the radially inner surface of said cap comprises at least one helical channel and the other of said radially outer surface of said cylinder and said radially inner surface of said comprises at least one respective projection to be received in said channel, said projection and channel together comprising said helical formation.

More preferably, the hollow cylinder said radially outer surface of said hollow cylinder comprises said helical channels and said cap comprises said projections.

In a preferred embodiment the helical formation has a pitch such as to resist the plunger's being driven downwards towards the lower end of the cylinder by a direct downward axial force.

In another preferred embodiment the inner wall of the hollow cylinder is of less diameter at its open lower end than at its open upper end.

In a further preferred embodiment the plunger engages the inner wall of the cylinder by means of a seal resiliently deformable to accommodate the reduction of diameter of the inner wall from its open upper end to its open lower end.

The seal may comprise two annular flanges engaging the inner wall of the cylinder in use.

In a preferred embodiment the seal is releasably secured to the plunger at the lower end thereof.

In another preferred embodiment the cap has an open upper end the apparatus includes a lid having a press-fit engagement with the upper end of the plunger to locate it on the cap in use.

In a further preferred embodiment the perforated closure is releasably secured to the cylinder by means of mutually cooperating screw threads.

The perforated closure may be configured and arranged to support a water-permeable filter upon which the coffee is placed in use.

The perforated closure may also configured and arranged to support the apparatus upon a said vessel for receiving the made beverage.

In a preferred embodiment the apparatus is formed with a handle or handles extending laterally of the perforated closure whereby the apparatus may be manually steadied over said vessel in use.

In another preferred embodiment the cap is manually rotatable by a user to drive the plunger downwards in use by means of the helical formation, and said helical formation provides a mechanical advantage greater than unity.

In a further preferred embodiment the beverage is coffee and said solid material is ground coffee.

Embodiments of the invention will be described, by way of example only, with reference to the accompanying drawings. The detailed embodiments show the best mode known to the inventor and provide support for the invention as claimed. However, they are only exemplary and should not be used to interpret or limit the scope of the claims. Their purpose is to provide a teaching to those skilled in the art.

DETAILED DESCRIPTION OF EMBODIMENTS OF THE INVENTION

Figure 1:
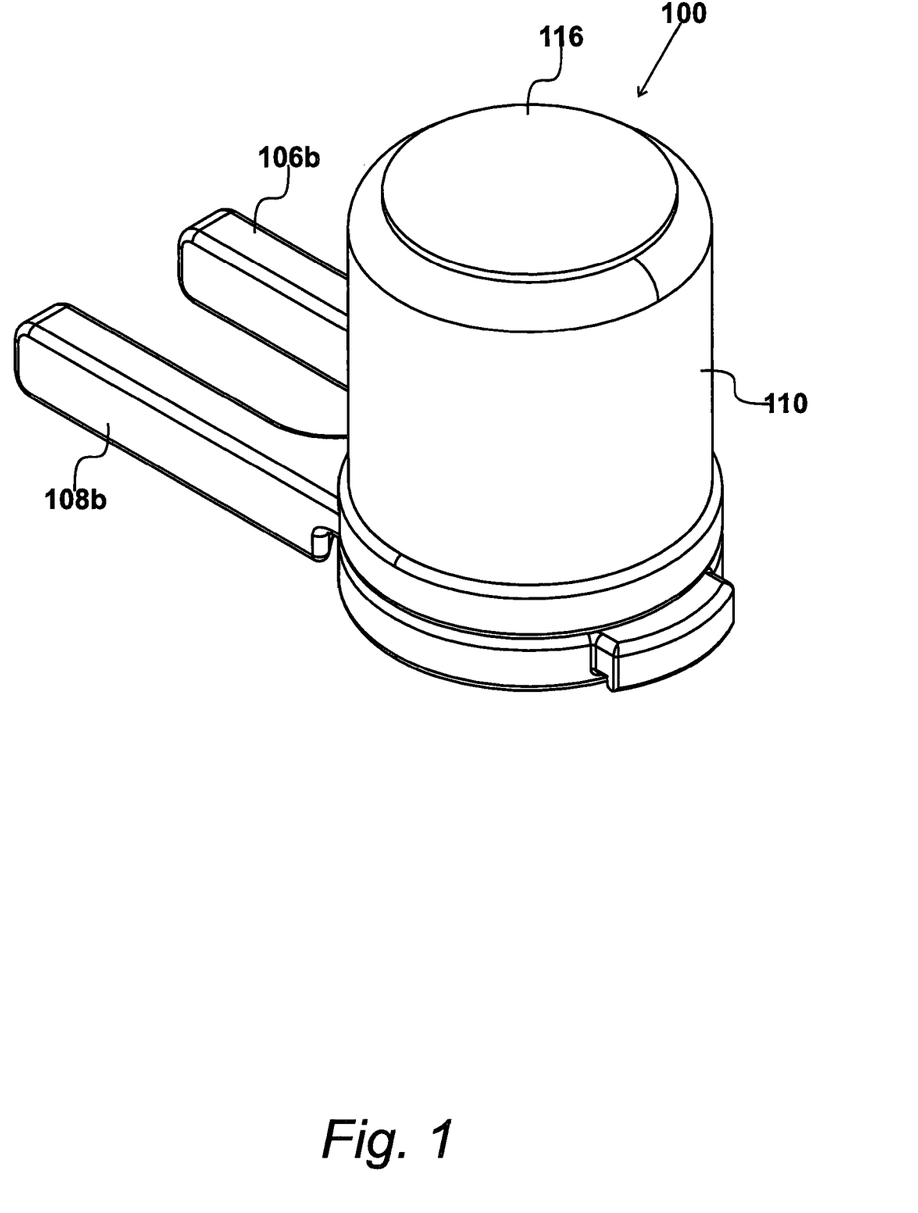
FIG. 1 is an isometric illustration of apparatus for making a hot beverage according to the invention.
Figure 2:
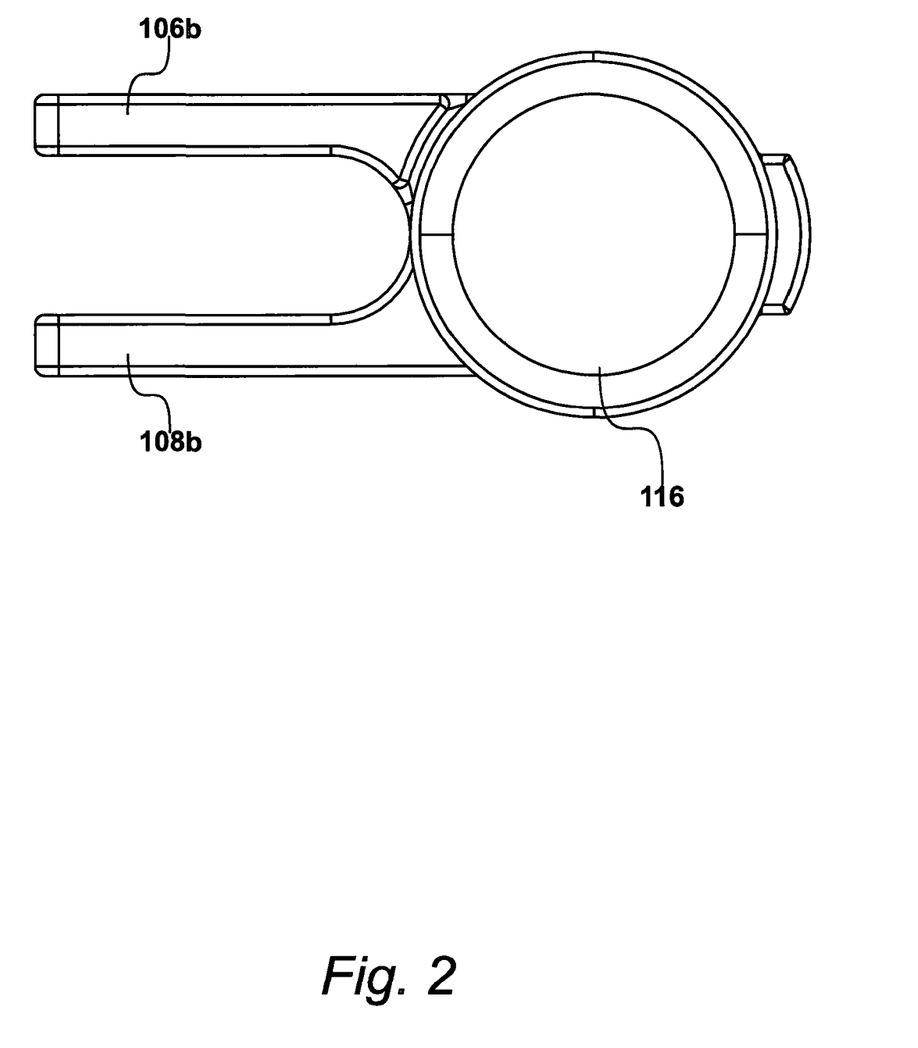
FIG. 2 shows the apparatus of FIG. 1 in plan view from above.
Figure 3:
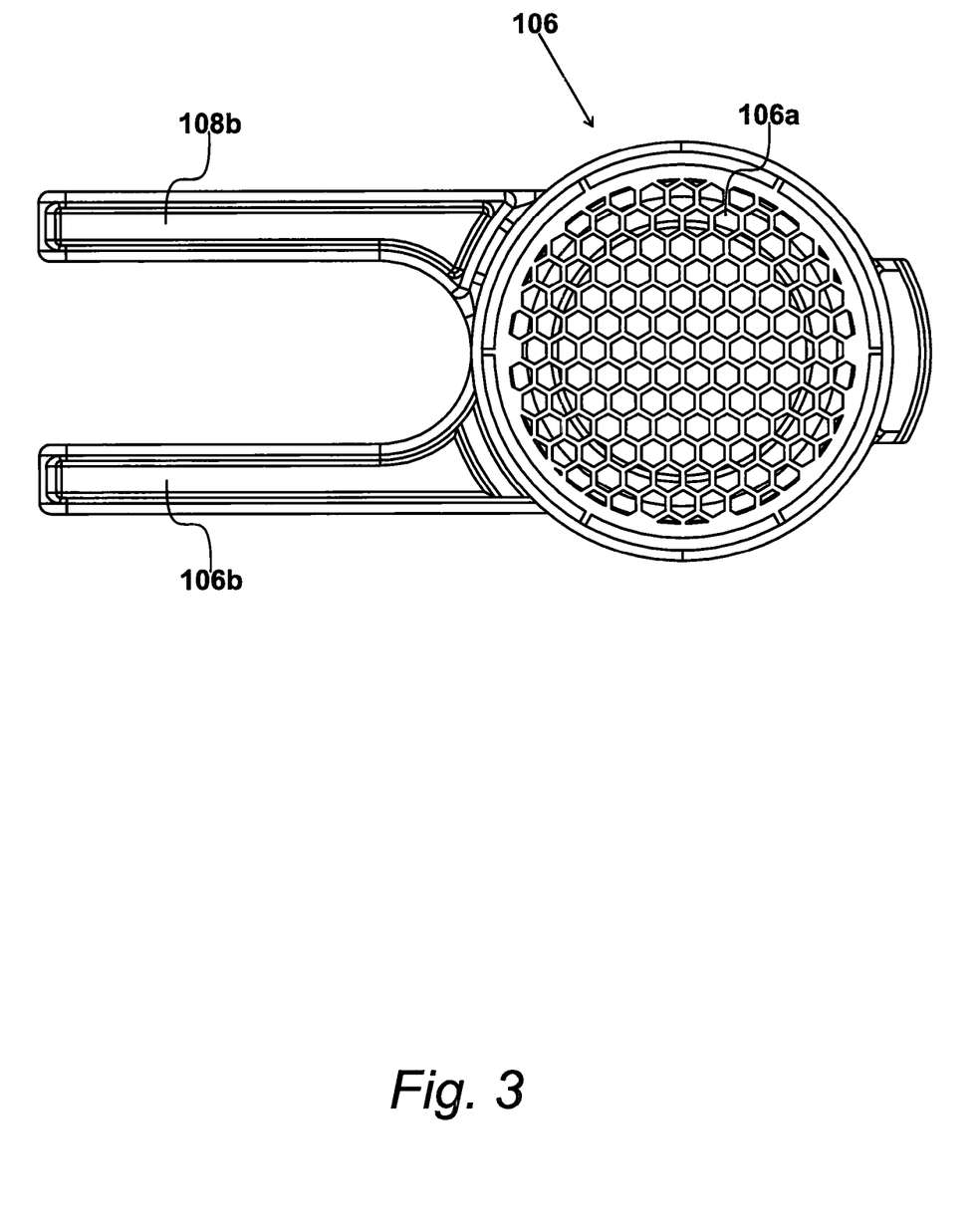
FIG. 3 shows the apparatus of FIG. 1 in plan view from below.
Figure 4:
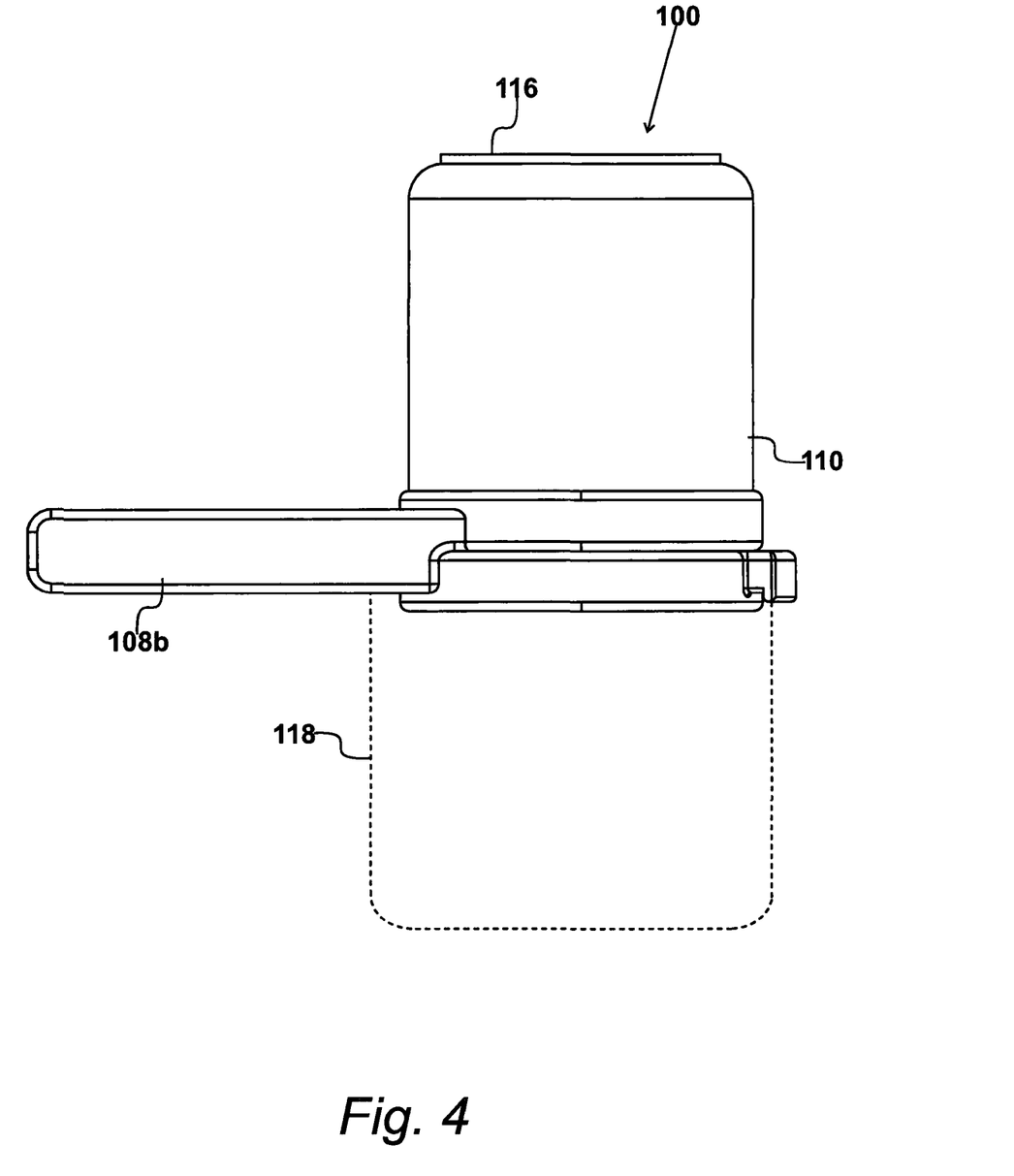
FIG. 4 shows the apparatus of FIG. 1 in side elevation.
Figure 5:
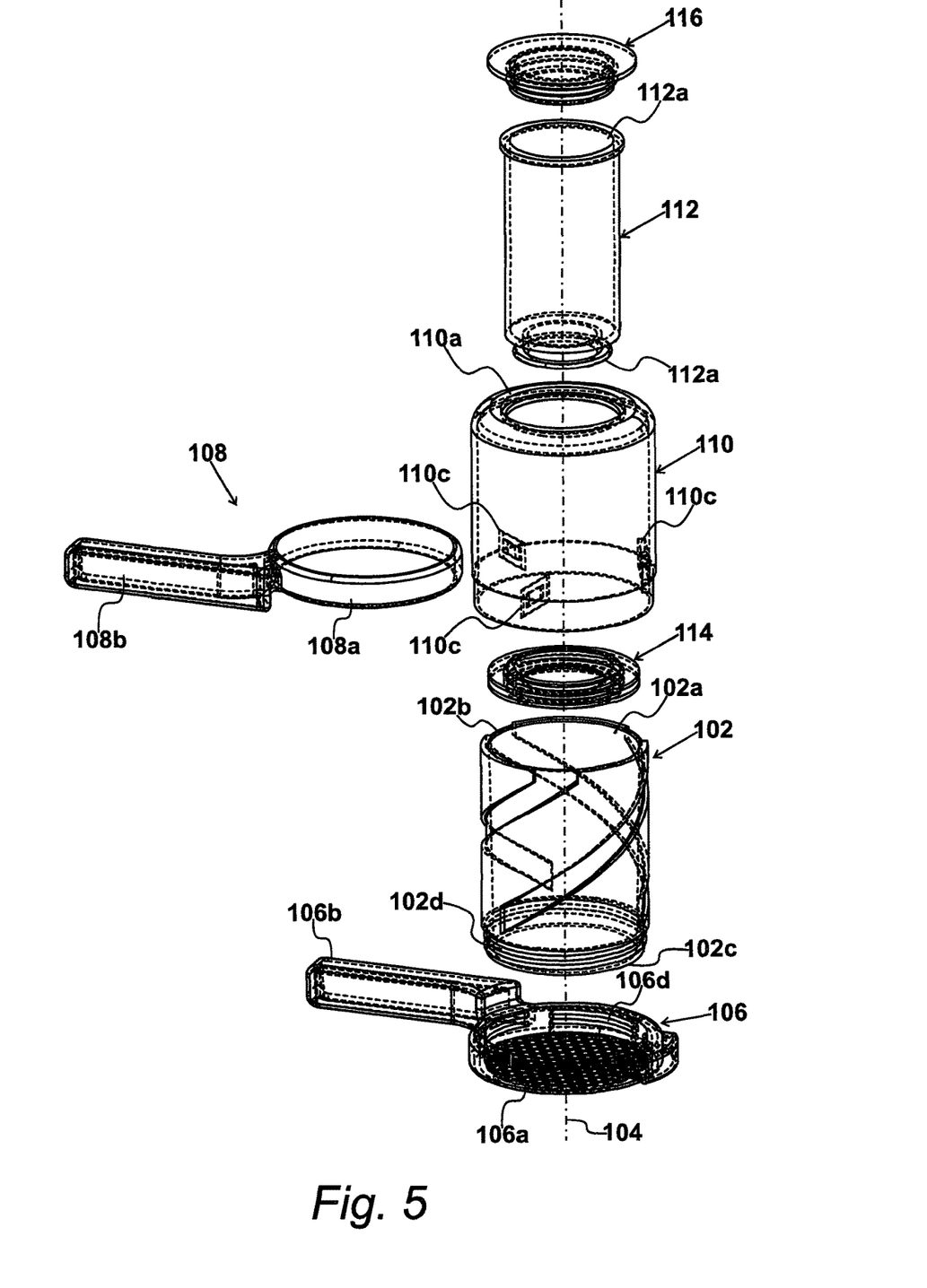
FIG. 5 is an exploded view of the apparatus of FIG. 1 showing a perforated closure with laterally extending handles, a hollow cylinder for containing hot water, a cap engageable with a helical channel of the hollow cylinder and rotatable thereon, a gasket, a plunger and a resiliently deformable seal releasable connected thereto, and a lid.

Referring first to FIGS. 1 to 5, these show apparatus 100 for making a hot beverage, such as coffee, according to the invention, and the components thereof. The components of the apparatus are:

A hollow cylinder 102 for containing hot water for making the coffee (see FIG. 5), the cylinder 102 having an inner wall 102a and extending along an axis 104 from an open upper end 102b to an open lower end 102c;

A perforated closure 106 having a mesh base 106a and being releasably securable (by means of mutually cooperating screw threads 106c and 102d shown in FIG. 5) to the lower end 102c of the hollow cylinder 102 and having a handle 106b extending laterally of the axis 104;

A handgrip 108 complementary to the perforated closure 106 and having a ring 108a (open, and configured and arranged to fit on the mesh base 106a) and a handle 108b extending laterally to lie in use parallel to the handle 106b of the perforated closure 106;

A cap 110 rotatable on the hollow cylinder 102 and arranged to carry a plunger 112 which in use has a resiliently deformable seal 114 releasably connected to its lower end 112a for sealing engagement with the inner wall 102a of the hollow cylinder 102; and A silicone lid 116 configured and arranged to engage the open upper end 112a of the plunger 112 and releasably connect it to the open upper end 110a of the cap 110.

Figure 6:
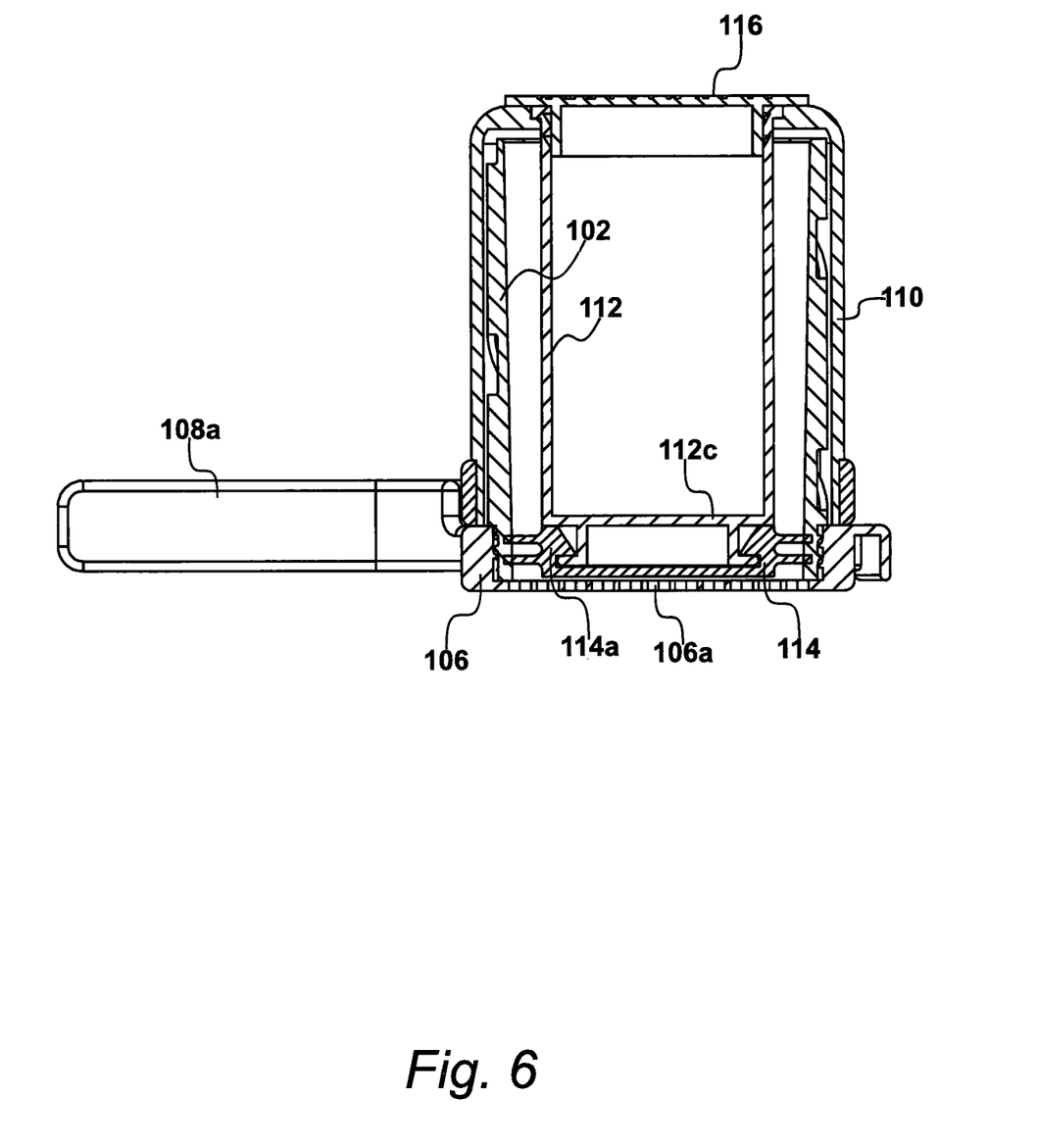
FIG. 6 is a vertical cross-section corresponding to FIG. 4.

The interconnection of the components of the coffee-making apparatus 100 in use can be seen from FIG. 6. The resiliently deformable seal 110 is releasably secured to the lower end of the plunger 112 which itself fits within the hollow cylinder 102 so that the seal 110 has sealing engagement with the inner wall thereof. (For simplicity of illustration, the reference numeral 102a for the inner wall of the hollow cylinder 102 is not included in FIG. 6, along with certain other reference numerals, but all are evident from FIG. 5 et al). The cap 110 fits over the hollow cylinder 102 and is rotatable thereon in a manner to be described hereinafter. And the plunger 112 is held in the cap 110 by means of the silicone lid 116.

Figure 7:
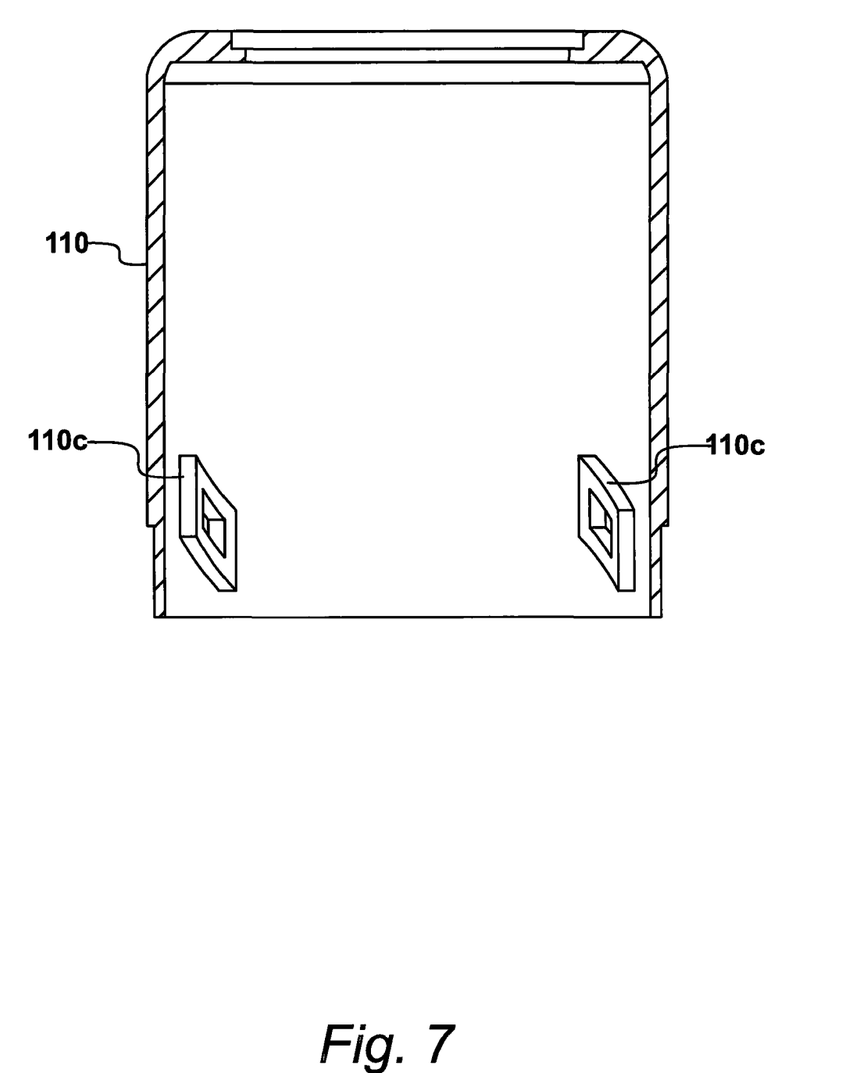
FIG. 7 is a vertical cross-section through the cap of FIG. 5.
Figure 9:
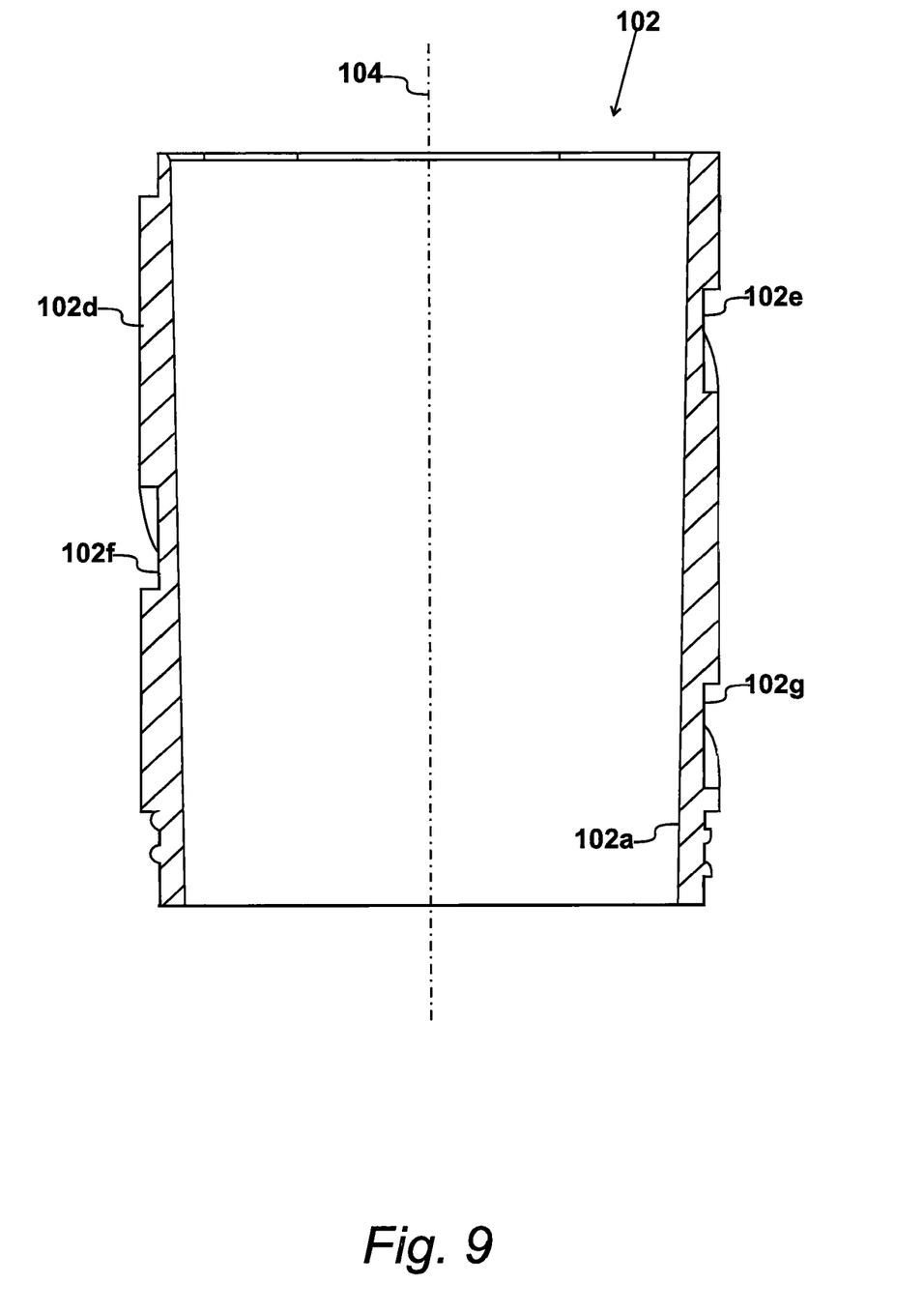
FIG. 9 is a vertical cross section through the hollow cylinder of FIG. 5.
Figure 10:
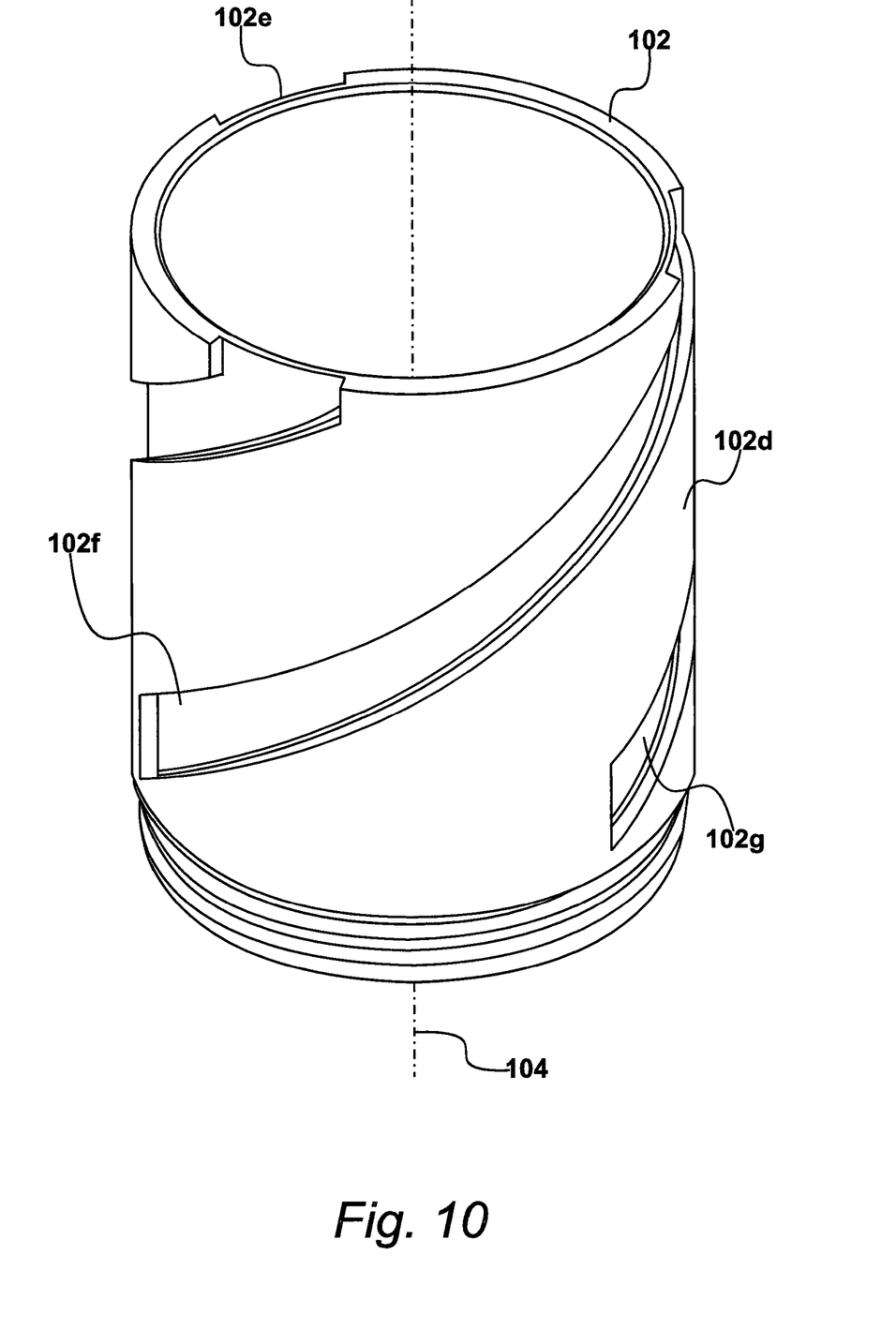
FIG. 10 is an isometric view of the hollow cylinder of FIG. 5.

The cap 110 is connected to the hollow cylinder 102 by a helical formation which will now be described. As can be seen from FIG. 9 and, most clearly, FIG. 10, the radially outer surface 102d of the hollow cylinder 102 is formed with three congruent and equally spaced helical channels 102e, 102f and 102g extending about and along the axis 104. As shown in FIGS. 5 and 7, the radially inward surface 110b of the cap 110 is formed with three projections 110c (of which only two are visible in FIG. 7) that each project radially inwards into a respective one of the channels 102e, 102f and 102g and is configured and arranged to fit the helical form thereof. Thus, with the projections 110c received in respective channels 102e, 102f and 102g, rotation of the cap 110 on the hollow cylinder 102 will cause it to move axially, as well as rotationally, by an amount determined by the pitch (that is, the amount of axial movement for one complete rotation) of the helical channels 102e, 102f and 102g.

Figure 8:
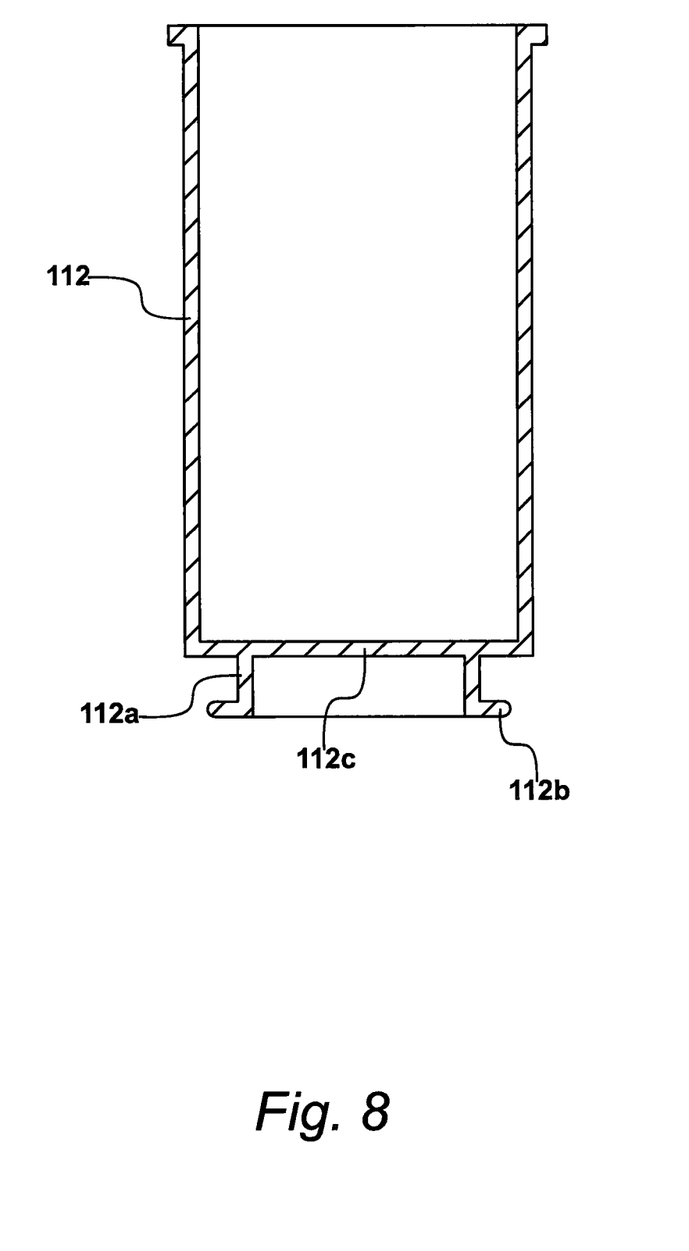
FIG. 8 is a vertical cross-section through the plunger of FIG. 5.
Figure 11:
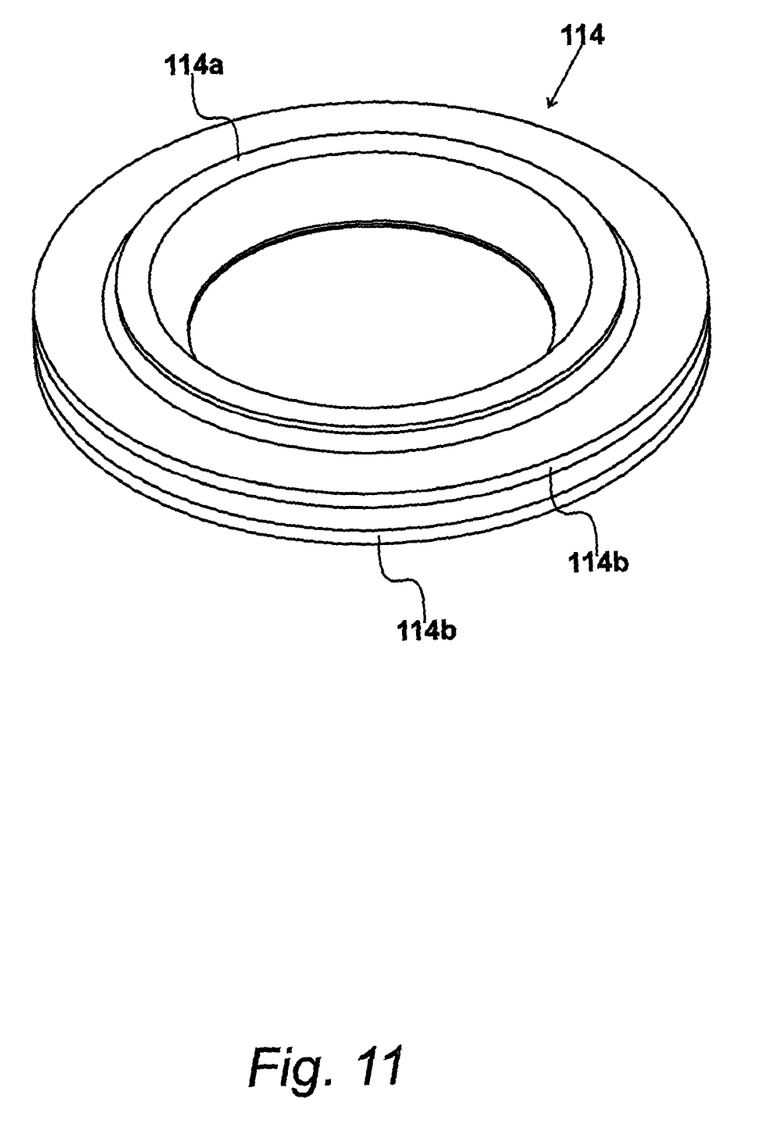
FIG. 11 is an isometric view of the seal of FIG. 5.

The releasable connection of the resiliently deformable seal 114 to the plunger 112 will now be described with particular reference to FIGS. 8 and 11. The plunger 112 is generally cylindrical and fits within the inner wall 102a of the hollow cylinder 102, as can be seen most clearly from FIG. 6. At its lower end 112a the plunger 112 is formed with a flange comprising a tubular portion 112a extending axially and concentric with the axis 104 and an annular portion 112b extending radially outwards therefrom. The seal 114 is formed with a ring 114a (see FIG. 6) formed to snap over the annular portion 112b of the flange on the bottom of the plunger 112 and to fit snugly between the annular portion 112b and the base 112c of the plunger 112, and around the tubular portion 112b.

The seal 114 is formed with two annular lips 114b extending radially outwardly to engage the inner wall 102a of the hollow cylinder 102 and form a watertight seal therewith.

Figure 12:
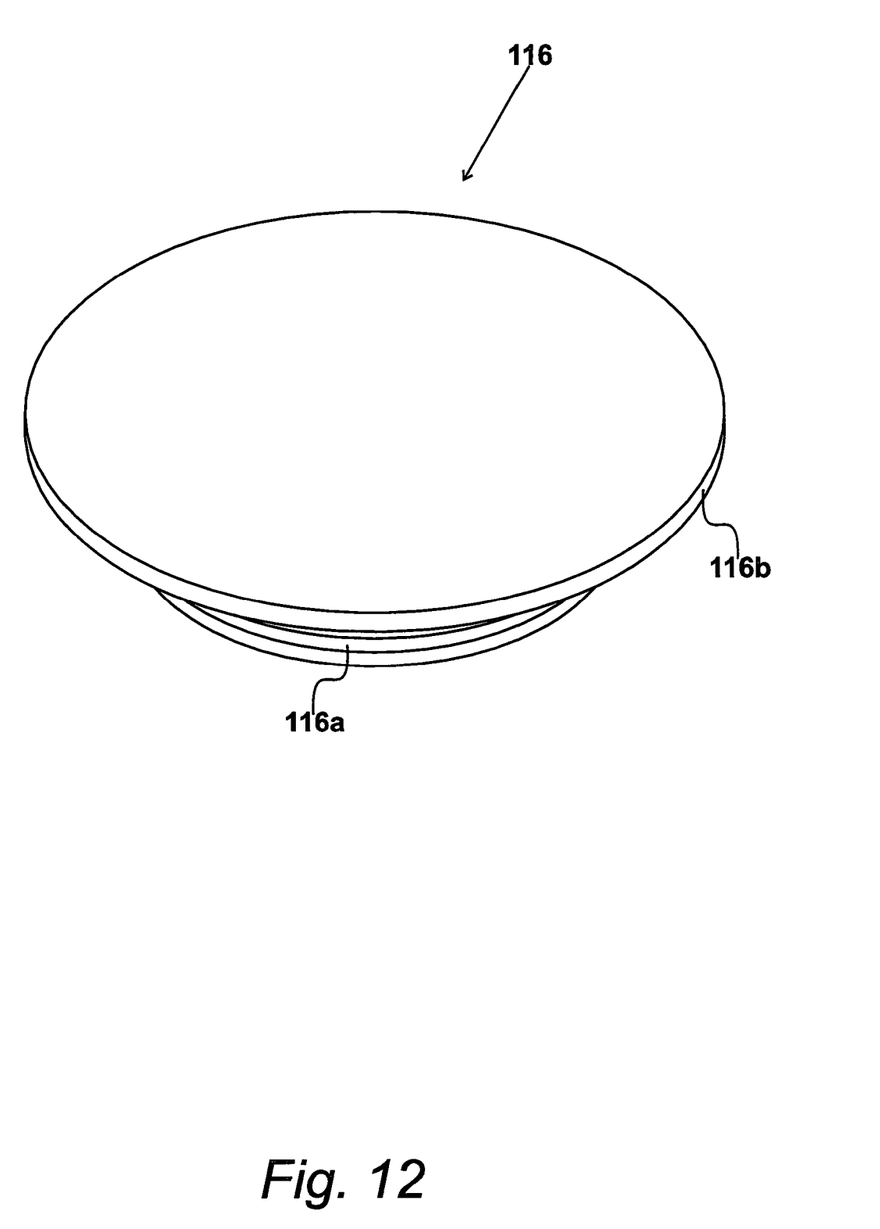
FIG. 12 is an isometric view of the lid of FIG. 5.

As shown in FIGS. 5 and 12, the lid 116 is formed with an axially extending flange 116a and an annular collar 116b extending outwardly therefrom. The flange 116a is a press fit in the open upper end 112a of the plunger 112 and the collar 116b then locates the plunger 112 on the top 110a of the cap 110.

The operation of the apparatus 100 will now be described. In this example the hot beverage being made is coffee and the solid material used brew the coffee is ground coffee. First, the seal 114 is attached to the lower end 112a of the plunger 112, which is then placed within the cap 110 and located therein by means of the lid 116. A paper filter (not shown) dimensioned to fit the perforated closure 106 is placed upon the mesh 106a thereof, and the perforated closure 106 with its complementary handgrip 108 connected to the lower end of the hollow cylinder 102. A selected quantity of the solid material from which the beverage is brew, that is ground coffee (not shown), is then delivered into the hollow cylinder 102, by way of its open top 102b, and onto the filter paper to be held thereby.

The subassembly comprising the hollow cylinder 102 (containing the ground coffee), the paper filter and the perforated closure 106 and its complementary handgrip 108 are placed on top of a vessel 118 (shown in broken lines in FIG. 4) to receive the coffee when made. It will be noted that the perforated closure and the handgrip 108 are together configured and arranged to sit safely on the vessel 118 and resist any sideways displacement, and the laterally extending handles 106b and 108b allow a user to provide additional manual stability.

With the subassembly comprising the hollow cylinder 102 (containing the ground coffee), the paper filter and the perforated closure 106 and its complementary handgrip 108 located on the vessel 118, hot water of an amount matched to the quantity of ground coffee is poured into the hollow cylinder 102. Then, preferably holding the subassembly steady by means of the handles 106b and 108b, the user places the cap 110 over the hollow cylinder 102 and enters the projections 110c respectively into the helical channels 102e, 102f and 102g. Finally, the cap 110 is rotated so that the engagement of the projections 110c within the helical channels 102e, 102f and 102g causes the cap to move downwards to press the hot water through the ground coffee on the paper filter, and thus the made coffee is delivered into the vessel 118.

After the coffee has been made, the apparatus can be readily disassembled for cleaning.

Among other things, the helical formation whereby the cap is connected to the hollow cylinder effectively multiplies the force applied to the water, inasmuch as the relative pitch of the helical channels (that is, the amount of axial movement divided by the amount of rotational movement) is less than one. In other words, apparatus for making coffee according to the invention requires less manual force on the part of a user than previously known filtering presses that required a user to apply direct downward pressure to the plunger. Also, apparatus according to the invention is more stable, and therefore safer, than previous filtering presses because the helical formation automatically produces axial movement when the cap 110 is rotated (whereas previous filtering presses are dependent upon more or less precise axial direction of manual force by the user) and because rotational movement of the cap 110 and thence of the plunger 112 reduces the chance of stiction or intermittent seizing between the seal 114 and the inner surface 102a of the hollow cylinder 102.

In an embodiment of the invention, each of the helical channels 102e, 102f and 102g extends substantially from the top to near the bottom of the hollow cylinder 102—an axial extent of 77 mm—and halfway around it. The outside of the cap 110, ie the part grasped by the user and rotated to drive the plunger 112 downward in use, has a diameter of 74 mm. The cap 110 is rotated by half a turn to drive the plunger 112 fully down, and half a turn represents a circumferential extent of ½×π×74 mm≈116 mm. It follows that the helical formation whereby the cap 110 is connected to the hollow cylinder 102 provides a mechanical advantage of nearly 1.6 (as 116/74=1.57).

This mechanical advantage means that the hot water can in use of the apparatus 100 be pressed through the ground coffee and the paper filter supporting it with greater force, ensuring an effective delivery of made coffee into the vessel 118. Alternatively considered, a user only needs to apply little more than 60% of the force that would be required for direct downward pressure without the mechanical advantage of the helical formation (as 1/1.57=0.64) which is a benefit to weaker users.

It should also be noted that the helical formation resists movement of the cap 110 down the hollow cylinder by direct downward pressure—just as a nut can be moved axially along a bolt by being rotated but cannot be moved axial by direct axial force. A helical pitch substantially less than 1 is recommended for this purpose, and in the described embodiment it is 0.64 (74/116). But in practice, even with a greater pitch, the user's hand applied to the cap 110 in an attempt to press it directly downwards will largely prevent the cap from turning and thereby prevent the plunger 112 from moving downwards.

Another important feature of this embodiment is that the diameter of the inner wall 102a of the hollow cylinder 102 is slightly smaller at its lower end than at its upper end. (In fact, the inner wall 102a tapers inwardly by 1° from its upper end to its lower end). The resilience of the seal 114, and in particular of the annular lips 114b thereof, is enough to accommodate the reduction in diameter as the plunger 112 is moved downwards in use, and the effect is to increase the pressure applied to the hot water (without losing the water-tight engagement, and without requiring any additional manual force) as the plunger moves towards the lower end of the hollow cylinder 102 where the ground coffee is held on the paper filter. This increased pressure ensures that substantially all of the hot water is driven out of the hollow cylinder 102, notwithstanding any "plugging" effect of the wet coffee grounds on the paper filter.

It will be appreciated by persons skilled in the art that the above embodiments have been described by way of example only and not in any limitative sense, and that various alterations and modifications are possible without departure from the scope of the protection which is defined by the appended claims. For example, in the embodiment described above the hollow cylinder 102 has the three helical channels 102e, 102f and 102g are formed and on an outer wall while the projections 102c are formed on an inner wall of the cap 110. However, this arrangement could be switched with the projections formed on an outer surface of the hollow cylinder 102 and the helical channels formed on the inner surface of the cap 110. Furthermore, the projections 110c, whether formed on the 110 or the hollow cylinder 102, could be significantly longer than shown in FIGS. 5 and 7 and could themselves be helical in formation to match the channels.

The embodiment described above includes three projections 110c and three helical channels 102e, 102f and 102g. Although the use of three channels and projections provides excellent stability for the rotational movement of the cap on the cylinder, other numbers of projections and channels could be used including a single channel and projection although this would be less desirable as it would be less stable in its movement of the cap.

The examples set out above are described in relation to the making of the beverage coffee using the solid material of coffee grounds. However, the invention may equally be used to brew other beverages using other solid materials. Examples include, but are not limited to, the making of the beverage tea using tealeaves.

The invention claimed is:

1. An apparatus for making a beverage and delivering it into a vessel below the apparatus, which apparatus comprises:
a hollow cylinder for containing hot water for making the beverage, said cylinder having an inner wall and extending along an axis from an open upper end to an open lower end of the cylinder;
a perforated closure releasably securable to the cylinder to hold solid material for brewing the beverage at said lower end; and
a cap carrying a plunger configured and arranged for sealing engagement with the inner wall of the cylinder, wherein said cap is rotatable on said cylinder about said axis and is connected to the cylinder by a helical formation, such that rotation of the cap on the cylinder drives the plunger towards the lower end of the cylinder to press the hot water through the perforated closure and the solid material held thereon and thence into said vessel, and wherein one of a radially outer surface of the hollow cylinder and the radially inner surface of said cap comprises at least one helical channel and the other of said radially outer surface of said cylinder and said radially inner surface of said comprises at least one respective projection to be received in said channel, said projection and channel together comprising said helical formation.

2. An apparatus as claimed in claim 1, wherein said plunger is removable from said cap.

3. An apparatus as claimed in claim 1, wherein said cap is removable from said cylinder.

4. An apparatus as claimed in claim 1, wherein the hollow cylinder said radially outer surface of said hollow cylinder comprises said helical channels and said cap comprises said projections.

5. An apparatus as claimed in claim 1, wherein said helical formation has a pitch that opposes a direct downward axial force to move the plunger towards the lower end of the cylinder.

6. An apparatus as claimed in claim 1, wherein the inner wall of the hollow cylinder is of less diameter at its open lower end than at its open upper end.

7. An apparatus as claimed in claim 1, wherein the plunger engages the inner wall of the cylinder by means of a seal resiliently deformable to accommodate the reduction of diameter of the inner wall from its open upper end to its open lower end.

8. An apparatus as claimed in claim 6, wherein the seal comprises two annular flanges engaging the inner wall of the cylinder in use.

9. An apparatus as claimed in claim 7, wherein the seal is releasably secured to the plunger at the lower end thereof.

10. An apparatus as claimed in claim 1, wherein the cap has an open upper end the apparatus includes a lid having a press-fit engagement with the upper end of the plunger to locate it on the cap in use.

11. An apparatus as claimed in claim 1, wherein the perforated closure is releasably secured to the cylinder by means of mutually cooperating screw threads.

12. An apparatus as claimed in claim 1, wherein the perforated closure is configured and arranged to support a water-permeable filter upon which the coffee is placed in use.

13. An apparatus as claimed in claim 1, wherein the perforated closure is configured and arranged to support the apparatus upon a said vessel for receiving the made beverage.

14. An apparatus as claimed in claim 1, wherein said apparatus is formed with a handle or handles extending laterally of the perforated closure whereby the apparatus may be manually steadied over said vessel in use.

15. An apparatus as claimed in claim 1, wherein said cap is manually rotatable by a user to drive the plunger downwards in use by means of the helical formation, and said helical formation provides a mechanical advantage greater than unity.

16. An apparatus as claimed in claim 1, wherein said beverage is coffee and said solid material is ground coffee.

17. An apparatus for making a beverage and delivering it into a vessel below the apparatus, which apparatus comprises:

a hollow cylinder for containing hot water for making the beverage, said cylinder having an inner wall and extending along an axis from an open upper end to an open lower end of the cylinder;

a perforated closure releasably securable to the cylinder to hold solid material for brewing the beverage at said lower end; and a cap carrying a plunger configured and arranged for sealing engagement with the inner wall of the cylinder, wherein one of a radially outer surface of the hollow cylinder and the radially inner surface of said cap comprises at least one helical channel and the other of said radially outer surface of said cylinder and said radially inner surface of said comprises at least one respective projection to be received in said channel such that rotation of the cap on the cylinder drives the plunger towards the lower end of the cylinder to press the hot water through the perforated closure and the solid material held thereon and thence into said vessel.

\* \* \* \* \*